United States Patent Office 3,450,253
Patented June 17, 1969

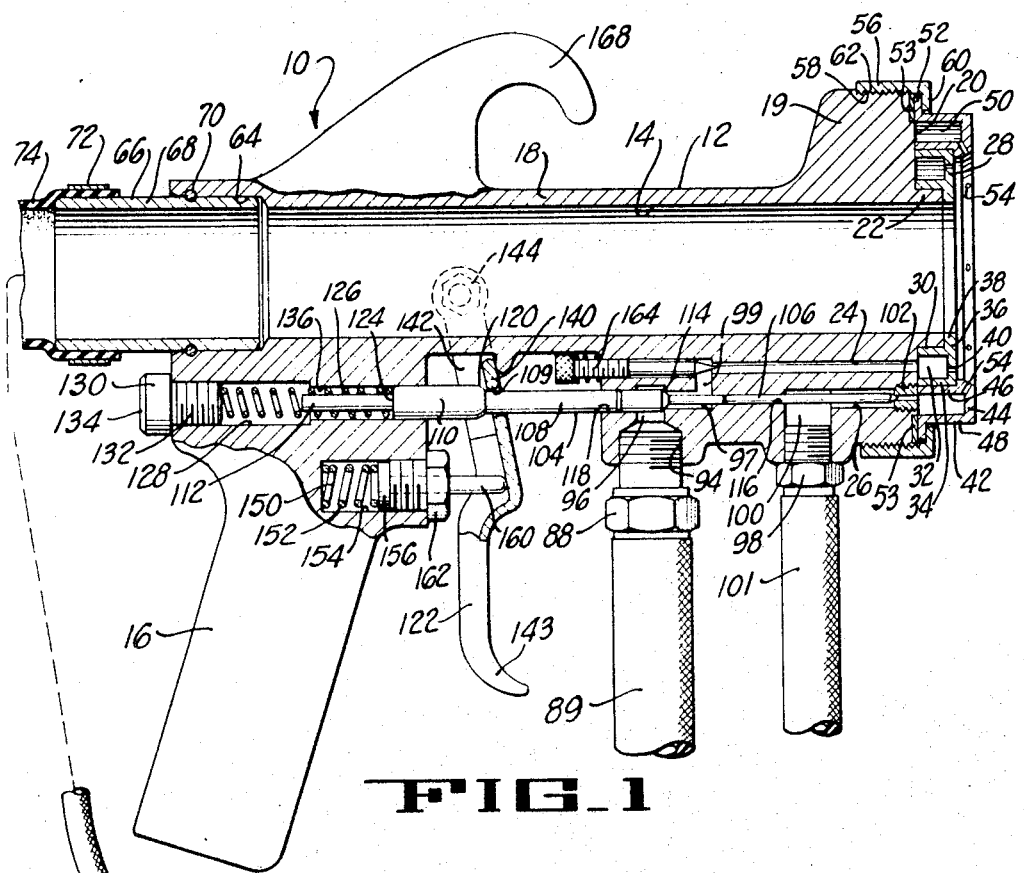
FIG_1
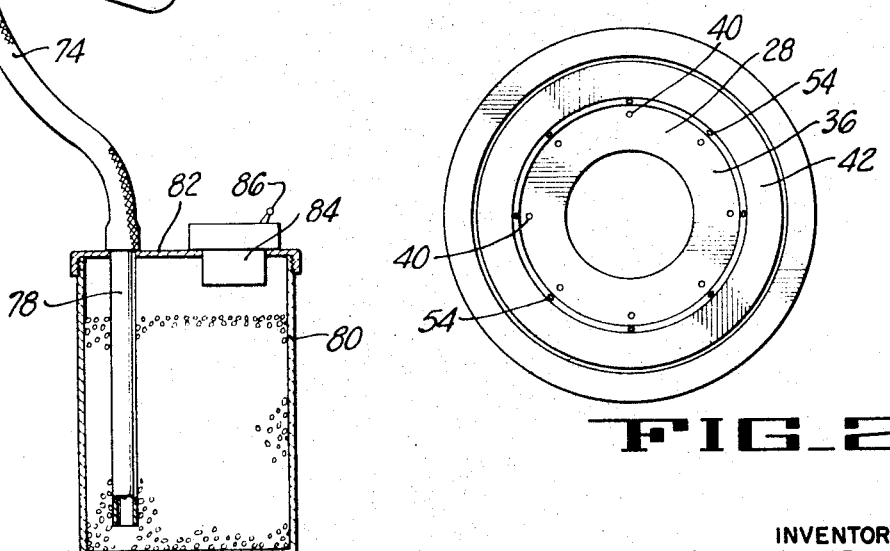
FIG_2
INVENTOR
PAUL O. NIELSEN
BY Francis W. Anderson
ATTORNEY

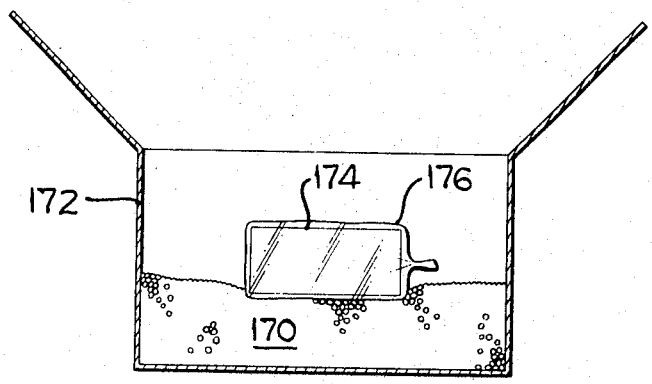
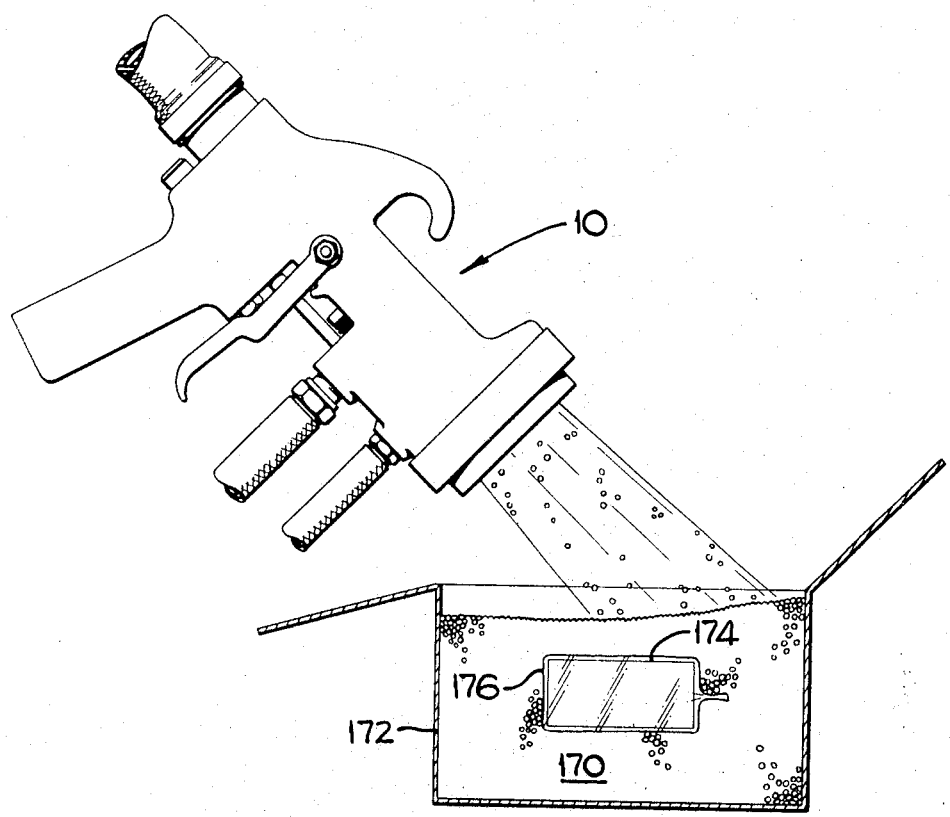

3,450,253
PROCESS FOR PACKAGING AND
PACKAGING MATERIAL
Paul O. Nielsen, Malibu, Calif., assignor to Polymer Engineering Corporation, Azusa, Calif., a corporation of California
Continuation-in-part of application Ser. No. 72,136, Nov. 28, 1960. This application Jan. 12, 1966, Ser. No. 520,181
Int. Cl. B65d 85/30
U.S. Cl. 206—46                                 10 Claims

ABSTRACT OF THE DISCLOSURE

A method of packaging a fragile article by spraying from separate sources and into a container so as to surround the article light-weight beads of expanded polystyrene and an aqueous latex dispersion. The beads are coated with a water-setting material which removes the excess moisture from the latex dispersion to allow the latex to adhesively bind the beads together and set up a solid mass, resilient cushioning structure about the article.

---

This application is a continuation-in-part of the copending application of Paul O. Nielsen, Ser. No. 72,136, filed Nov. 28, 1960, and entitled Process For Applying Insulation and Insulation Structure, now Patent No. 3,257,229, issued June 21, 1966.

The present invention pertains to a process for packaging and a packaging material and more particularly to a process for forming a light-weight, resilient cushioning structure about an object in a container such as a shipping carton and to the composition of such cushioning structure.

It has been discovered that discrete particles of insulating material may be effectively and rapidly bonded together employing an aqueous synthetic resin dispersion or latex and a moisture absorbing material which preferably has a water-setting characteristic to form an insulation structure that is effective as a heat insulating medium and as a shock insulating medium. The synthetic resin latex is characterized by its ability to enter into a green cure upon the loss of excess water. Latex in its green cure stage provides an effective and swift bonding of adjoining insulation particles together. The moisture absorbing material, generally in a powdered form coated on the surface of the insulation particle, serves to extract at least part of the excess water of the synthetic resin latex, thus aiding the placement of the resin latex in its green cure form.

Various moisture absorbing and water setting materials may be employed with the preferred materials being hydraulic setting compositions such as gypsum plaster and various ones of the hydraulic cements including portland cement, alumina cement, magnesia cement and natural or Rosendale cement. The moisture absorbing and water setting material, in addition to extracting excess water from the synthetic resin latex, adds strength to the resulting insulation structure. It is possible by varying the amount of hydraulic cement or gypsum plaster or the like to vary the flexibility of the structure. The use of large amounts of cement and plaster results in more rigid structures.

A preferred latex for use in the process is an aqueous dispersion of a butadiene styrene copolymer (GR-S synthetic rubber). Various insulating materials, provided in particle size, may be used, for example, cork, kapok, asbestos, mineral wool, and various ones of the foam plastics (synthetic resins) such as foam polyurethane or polystyrene. Beads of expanded polystyrene which are commercially available are particularly desirable material. Particle sizes are preferably less than one-quarter of an inch where the application is through a gun spraying technique hereinafter described although particles of larger size may be handled, especially where the application is a hand operation. Expanded polystyrene plastic is available in bead form of less than .030 inch in diameter.

A preferred embodiment of the process of the invention that is particularly adaptable for forming an insulation or cushioning layer of packaging material around a fragile article in a shipping container or the like comprises delivering the insulation or cushioning particles coated with a moisture absorbing and moisture setting material to an air suspension of finely divided latex. The particles in passing through the air suspension of the resin latex become coated with the latex, thereby bringing the latex into contact with the moisture absorbing material to extract excess water from the latex, placing it in a green cure having adhesive properties. The latex coated particles are directed into the container to surround the article to be protected, forming the insulation or cushioning shell enclosing the article. The aforementioned expanded polystyrene beads form a preferred insulation or cushioning structure for use in this embodiment of the process.

One of the advantages of this method of packaging is that it eliminates the necessity of using pre-formed packaging molds or materials. It is especially applicable where a wide variety of package sizes are required. The process can be performed rapidly, as will be set forth in more detail hereinafter, without requiring the use of costly and complex equipment.

Of the various aqueous synthetic resin latexes available, the most satisfactory is the synthetic rubber latex formed of the copolymer of butadiene and styrene. Various others of the available synthetic rubber latexes such as polybutadiene, polyisoprene, the polyester rubbers, the acrylic rubbers and the like may be employed. A particularly desirable latex for the use in the process is the type now known as GR-S-2000, which contains a butadiene/styrene monomer charge content of 50/50 with the potassium soap of crude rosin as the emulsifier. GR-S-2000 latex normally has a solid content of 35-40%. It has been experienced that increasing of the water content of the latex or lowering of the styrene content in the instance of the butadiene/styrene copolymer, lengthens the time required for the synthetic resin latex to enter its green cure. Such lengthening of time required for the synthetic resin latex to set up because of increased water content or decreased styrene content may be offset by increasing the amount of water absorbing material, for example gypsum plaster, used in the coating of the insulation particles. Preferably, the insulation particles are treated to carry the minimum of plaster dust or other water absorbing material needed to place the synthetic resin latex in its green cure.

In the use of the process of the invention to apply the insulation particles into a container and about an article which may be subject to breakage in shipment, it has been found that gypsum plaster and the synthetic resin latex of butadiene-styrene copolymers constitutes a superior combination of materials. The combination of these two materials provides a more or less instantaneous binder. Of the numerous moisture absorbing materials investigated, gypsum plaster has been found to have the most desirable properties. It has been proven capable of extracting excess water from the rubber latex without imparting objectionable properties to the resulting cushioning structure. Cement, while usable for many applications, is not as fully acceptable as gypsum plaster, for the reason that it tends to impart brittleness to the resulting structure. Other moisture absorbing materials are available, such as wheat flour, cornstarch, and various other starches and carbohydrates.

The ratio of the insulation or cushioning particles, aqueous resin latex and water absorbing material employed in the process, varies widely depending among other things on the particular material used, the exact aqueous resin latex employed, the particular water absorbing material utilized and the degree of flexibility desired in the structure. The density of the particles has a particularly important bearing on the material ratios. The manner of application, e.g., through a gun or by hand, has a bearing on the ratio of materials used. The following ratio ranges have been found to be generally satisfactory, and particularly suitable in those instances where the insulation or cushioning particles are formed of foam plastic materials, such as expanded polystyrene beads and the like. Normally one quarter to one pound of water absorbing material, such as gypsum plaster, will be utilized for one cubic foot of the particles, say expanded polystyrene beads. Expanded polystyrene beads vary considerably in density, but will generally have a density falling within the range of three quarters of a pound per cubic foot to one and one-half pounds per cubic foot. High density polystyrenes may also be used for packaging and the like running up to about six pounds per cubic foot. The insulation structure of the invention may be conveniently formed around articles placed within a shipping container. Generally speaking, the plaster or other water absorbing material will be used in an amount of 10% to 100% on a weight basis of the insulation or cushioning material. It should be remembered that the more plaster used, the more rigid the structure becomes.

Based on a 50% solid aqueous resin latex and the above weight range of water absorbing material to insulation or cushioning particles, the weight ratio of latex emulsion to dry, water absorbing material, say gypsum plaster, is approximately one to one. There will be applications, for example, in packaging where the ratio may be increased to, for example, two parts of latex emulsion to one plaster. The increased latex ratio enhances the resiliency of the structure. In insulation practice, for example, of a vertical wall as contrasted to the use of the process in packaging, the increased moisture content (resulting from increase in latex or a decrease in plaster) is to be avoided, as this results in undesirable characteristics including possible dry rot and adverse effects on insulation properties.

The total density of the formed cushioning or insulating mass used in packaging will range between about 0.9 pound per cubic foot and about 6 pounds per cubic foot when expanded polystyrene beads are used as the cushioning medium. The preferred range is from about 1.25 pounds per cubic foot to about 1.8 pounds per cubic foot.

In the preferred embodiment, the process of the invention is practiced with the assistance of a spray gun of a special design. The spray gun delivers insulation particles via its bore through a latex-air mist formed externally of the gun to a wall surface. The latex-air mist is generated by streams emitting from the gun. A preferred embodiment of the gun is hereinafter described. The process may be practiced by mixing the components by hand or by means other than by the spray gun.

Various ways are available for coating the insulation or cushioning particles with water absorbing material. The most simple way of coating the particles involves tumbling of the particles in a vessel containing some of the gypsum plaster or other moisture absorbing material. The gypsum plaster or other material may be applied by using an alcohol, say isopropyl alcohol, to wet the particles with the plaster and subsequently recovering the alcohol through flashing.

It is an object of the present invention to provide a process for packaging articles with a cushioning material which will eliminate the need for pre-forming packages to meet the contours of the article.

Another object of the present invention is to provide a cushioning material which can be easily and quickly formed in place about an article to be protected in a shipping container.

The foregoing objects, advantages, features and results of the present invention, together with various other objects, advantages, features and results thereof, which will become apparent to those skilled in the art in light of this disclosure may be attained with the spray gun described in greater detail hereinafter, and illustrated in the accompanying drawings in which:

FIGURE 1 is a side view, partially cut away and in part in cross section, showing a preferred embodiment of the spray gun which may be used in the practice of the process of the invention;

FIGURE 2 is an end view of the spray gun of FIGURE 1;

FIGURE 3 is a diagrammatic section through a package illustrating the formation of the bottom layer of the shock-absorbing material; and FIGURE 4 is a section through a package similar to FIGURE 3 but illustrating the formation of the shock-absorbing material around the protected article subsequent to the step in the packaging method shown in FIGURE 3.

The gun described hereinafter is particularly suitable for use in the process of the invention. The process may be practiced by hand mixing of the plaster coated (or cement coated, etc.) insulation or cushioning particles with the synthetic resin latex. Hand mixing may be beneficially employed where the insulation particles are used to fill a cavity, such as the interior of a wall. In the latter application the use of a spray gun is frequently awkward. Spray guns other than the particular gun described may be used in the process provided the gun is capable of generating an air-latex mist externally of the gun through which the insulating particles pass. In an alternative embodiment the air-latex mist may be generated by one means and a second means utilized for propelling the insulation particles therethrough.

The spray gun 10 of FIGURE 1 is provided with a gun barrel 12, having a relatively large bore 14, affixed to a gun handle 16. The gun barrel 12 has a thick wall construction. The barrel 12 at its outer end is flared outwardly to provide a bulbous portion 19 having a forwardly facing end 20 of a significantly larger outside diameter than the outside diameter of the barrel proper. The forward end 20 carries a forwardly-projecting circular lip 22 which has an outside wall with a diameter significantly less than the outside dimension of the gun barrel. The inner wall of the circular lip coincide with the wall of the bore 14 of the gun. Two spaced fluid passages 24 and 26 open in a forwardly direction through the forward end 20 of the gun barrel 12 outside of the circular lip 22. The inner passage 24 is normally used for the flow of latex emulsion while the other outer passage 26 generally carries air.

A first fluid dispersing ring member 28 (a latex dispersing ring) is positioned around the forwardly-projecting circular lip 22 at the flared end 20 of the gun barrel 12 with an inner circular wall 30 of the ring member snugly engaging the outer wall of the lip. The ring member 28 houses an annular chamber 32 which is defined by the inner circular wall 30, together with an outer circular wall 34 spaced therefrom, and a forward wall 36 joining the outer edges of the two circular walls. The fluid ring member 28 has no back wall; however, with the ring member in its assembled position, a portion of the forward end 20 of the gun barrel 12 provides in effect a rear wall for the ring. As best seen in FIGURE 1, the fluid carrying passage 24 opens into the annular chamber 32 of the fluid ring member 28. The forward wall 36 of the fluid ring member 28 extends inwardly beyond its juncture with the inner circular wall 30 to provide a ledge 38 which rests against the forward end of the circular lip 22, stopping at the bore 14 of the gun barrel. The fluid ring member 28 has several spaced, forwardly-opening apertures 40, eight in the embodiment illustrated.

These apertures 40 permit the escape of fluid from the annular chamber 32 in a direction parallel to the axis of the gun barrel 12.

A second fluid dispersing ring member 42 which may be described as an air ring, is fitted around the fluid ring member 28 in the assembled gun as shown in FIGURE 1. The air ring, like the fluid ring member 28, has no rear wall, and is provided with a forward wall 44 which joins two spaced circular walls 46 and 48. The inner circular wall 46 snugly engages the outer wall 34 of the first fluid ring member 28. This inner wall 46, the outer circular wall 48, and the transversely-extending forward wall 44 together define a second annular chamber 50. It will be noted that the outer circular wall 48 has an integral outwardly-extending flange portion 52. The forward wall 44 of the air ring 42 is provided with several spaced apertures 54 opening in a generally forward direction, leading from the second annular chamber 50. The apertures 54 in the particular embodiment illustrated open at an angle of approximately 45° to the diameter of the air ring 42 in an inwardly direction. The two fluid ring members 28 and 42 are provided with the same number of apertures. Each of the several forwardly-opening apertures of the air ring 42 is aligned, as best seen in FIGURE 2, with a corresponding aperture of the latex ring 28. This is done to assure that the respective fluid streams of air and latex issuing from the two rings will collide to generate a mist.

A plane extending longitudinally of the gun and containing the axis of the gun barrel 12 and cutting through an aperture of one of the two fluid ring members 28 and 42 will pass through a corresponding aperture of the other ring member. Latex emitting from the inner fluid ring member 28 leaves that ring in a line lying substantially parallel to the axis of the gun barrel 12. Air issuing from the outer fluid ring member 42 exists in a stream with an angle of approximating 45° to the stream emitting from the latex ring member 28.

A knurled ring member 56 having an internally threaded wall 58 with an inwardly-extending flange 60 at its forward end, engages an exteriorly-threaded portion 62 of the bulbous portion 19 of the gun barrel 12. The inwardly extending flange 60 of the knurled ring member 56 at its inner side engages the outer wall of the outwardly-extending flange 52 of the second ring member 42, holding the flange 52 in tight engagement with a sealing washer 53. The threading of the knurled ring member 56 to engage substantially all of the exterior threads of the bulbous portion 19 results in locking the outer ring member 42 and the inner ring member 28 against the sealing washer 53 at the forward end 20 of the gun barrel 12. Shifting of one of the fluid ring member 28 or 42 with respect to the other, before cinching down of the knurled ring 56, to align the corresponding apertures of the two fluid ring members, places the gun in its operative form.

The bore at its rearward end 64 is slightly enlarged to provide a chamber for receiving a tube connector assembly 66, which is made up of a short tube member 68, a split snap ring 70, and a metal band 72 which secures a material feed hose 74 to the outer end of the tube member 68. The split snap ring 70 seats in an external groove provided in the external wall of the inner end of the tube member 68, with the outer wall of the snap ring engaging a mating groove provided in the wall of the bore 14. One end of the material feed hose 74 is fastened to a siphon tube 78 placed within a container 80 with its lower end spaced a short distance from the bottom of that container. The container 80 carries on its top closure 82 a motor and air fan 84 which, when operating, provide a small gauge pressure of three to five p.s.i.g. within the container 80. The container 80 is filled with insulation particles, for example, polystyrene foam beads, to the level indicated in FIG. 1. The small positive pressure on the surface of the insulation particle bed is adequate to provide a gas supported stream of the solid particles through the material feed hose 74 to the bore 14 of the gun when the air motor is operating. The air motor is controlled through a switch 86.

Liquid latex is supplied to the body passage 24 of the gun 10 through a quick-connect type fitting 88 to which a latex supply hose 89 is connected. The upper end of the fitting 88 is externally threaded to engage the internal threads of a downwardly-opening cavity 94 provided at the underside of the gun barrel 12. The cavity 94 is connected through a series of short passageways 96, 97 and 99 to the aforementioned latex passage 24 leading to the inner, first fluid ring member 28. Forward of the fitting 88, there is provided a smaller quick-connect type fitting 98 to which an air hose 101 is connected. The second fitting 98, like the latex fitting 88, carries external threads at one end which engage internal threads of a second, downwardly facing cavity 100 in the gun barrel 12. The air passage 26 of the gun barrel 12 opens laterally into the top of the second body cavity 100. The forward end of the air passage 26 is internally threaded to receive a valve seat insert 102.

Flow of latex emulsion and air through the respective passages 24 and 26 is simultaneously controlled through operation of an elongated, flow control needle 104. The control needle 104 is made up of four succeeding segments including a first valve portion 106, a second valve portion 108, a trigger engaging portion 110 and a coil spring retainer stem 112, arranged in that order from the outer, forward end of the control needle to its rear end. The first valve portion 106 at the forward end of the control needle 104, is the longest of the four segments making up the control needle and, like the others, has a circular cross section. The first valve portion 106 has the smallest diameter of all four segments and terminates in a tapering valve point which, when the control needle is in its closed position, seats in the valve seat insert 102, closing the passage 26 to the flow of air. When the flow control needle 104 is moved rearwardly, the first valve portion 106 leaves the valve seat insert 102, opening the passage 26 to the flow of air. The second valve portion 108 has a diameter somewhat larger than that of the first valve portion 106 and with the flow control needle 104 in its closed position, the second valve portion 108 blocks the short passageway 97, preventing the flow of latex via the fitting 88 to the latex passage 24 of the gun barrel 12. The forward end of the second valve portion 108 has a shoulder 114 which, in the closed position, seats against the entrance port of the passageway 97. As seen in FIG. 1, the flow control needle 104 parallels the axis of the gun bore 14 and the first and second valve portions 106 and 108 are respectively movably carried in guideways 116 and 118 formed in the underside of the gun barrel 12. As illustrated, the two guideways 116 and 118 are in alignment. The major portion of the second valve portion 108 of the flow control needle 104 extends rearwardly from the guideway 118, and is outside of the body of the gun proper. The second valve portion 108 at its rearward end expands into the trigger engaging portion 110 of the flow control needle 104. A shoulder 120 formed at the juncture of the second valve portion 108 and the trigger engaging portion 110 is adapted to engage a trigger assembly 122 with the smaller diameter second valve portion 108 extending forwardly through an aperture 109 of the trigger. The aforementioned coil spring retainer stem 112 of the flow control needle 104 extends rearwardly from the trigger engaging portion 110. The stem 112 has a diameter significantly less than the adjoining trigger engaging portion 110, thus providing a shoulder 124 at the juncture of the two segments against which a coil spring 126 rests, which tends to force the flow control needle 104 forwardly, to the right in FIG. 1, to close off the two fluid passageways 24 and 26.

The upper portion of the handle 16 is provided with a spring retaining cavity 128 which is internally threaded to receive a compression adjusting screw 130, which has a threaded body 132 terminating in a head 134. The forward end of the spring retaining cavity 128 opens into a flow control needle guide passageway 136 of somewhat reduced diameter. The coil spring 126 has substantially the diameter of the guideway 136 and extends from the compression adjusting screw 130 inwardly through the spring retaining cavity 128 and a portion of the guideway 136, terminating against the aforementioned shoulder 124 of the trigger engaging portion 110. The compression provided by the coil spring 126 may be varied by turning the compression adjusting screw 130 to different positions.

The trigger assembly 122 is made up of a yoke 140 formed of two arms 142 and a trigger spring subassembly 150, with a trigger proper 143 being a continuation of the underside of the yoke. The arms 142 of the yoke 140 are pivotally connected to opposite sides of the gun barrel 12 by screws 144 which are threaded into the wall 18 of the barrel. Neither of the screws 144 penetrates the wall 18 of the gun barrel. By employing a yoke, it is possible to leave the bore 14 of the gun clear and unobstructed to the flow of the air supported stream of insulation particles. The yoke 140 ends immediately below the underside of the flow control needle 104. The aforementioned aperture 109 for the control needle 104 is in the base of the yoke 140. The trigger 122 has a generally U-shaped cross section.

The trigger spring subassembly 150 serves to hold the trigger 122 in its off position, in which position the flow control needle 104 closes off the fluid passages 24 and 26. The trigger spring subassembly 150 comprises a compression spring 152 positioned in a compression spring cavity 154 of the gun handle, with one end of the spring engaging the face of a plunger member 156, which member has a forwardly extending stem 160. The stem passes through a central hole of a trigger spring compression adjusting screw 162, and beyond this screw the free end of the plunger stem 160 engages the trigger 122. Turning of the trigger spring screw 162 in and out of the cavity 154 (into which it is threaded) permits adjustment of the compression strength of the spring 152. With the plunger member 156 engaging the inner wall of the screw 162, the trigger assumes its full off position, and in this position the coil spring 126 forces the flow control needle 104 into its full off position, closing the two fluid passages 24 and 26. An operator applying force to the trigger 122 compresses the trigger compression spring 152, moving the trigger towards the handle, and with further activation of the trigger, the shoulder 120 of the trigger engaging portion 110 of the flow control needle 104 contacts the trigger proper and is moved to the left as seen in FIG. 1, against the compression of the coil spring 126 and, in so doing, the first valve portion 106 moves away from the valve seat insert 102, opening the passage 26 to the flow of air, and simultaneously the second valve portion 108 is moved, opening the passageway 97 and passage 24 to the flow of the latex emulsion.

The latex passage 24 is provided with an overriding needle valve 164 at its inner end. A forwardly-opening hook 168 is provided at the top of the gun barrel 12 for ease of manipulation. The latex emulsion supplied to the fitting 88 and the compressed air supplied to the second fitting 98 are generally each under a pressure in the range of 35 to 40 p.s.i.g.

As mentioned earlier, it is important to avoid jamming of the passageways with the latex emulsion. The gun of the invention is specially designed to facilitate cleaning of the device on termination of its use. It will be apparent that the two fluid ring members 28 and 42 may be readily removed from the gun through removal of the knurled ring member 56. The elongated flow control needle 104 is easily removed by unscrewing and removing the compression adjusting screw 130 of the gun handle 12. After removal of the compassion adjusting screw 130, the flow control needle and coil spring are removed from the gun by simply tilting the device. The fittings 88 and 98 are of the quick connect type and are also readily removed. Thus it is seen that the gun may be stripped and its components quickly placed in a suitable solvent. In some operations it may be feasible upon discontinuing the flow of the latex emulsion to substitute a solvent line to the fitting 88 and in this fashion subject the gun to an initial clean-up. Of course, while so cleaning the gun, the material feed hose is disconnected.

The spray gun technique is a preferred way of practicing the process of the invention. The use of a latex mist to coat the polystyrene balls or other insulation particles is highly satisfactory. It is more difficult without the use of the spray gun to obtain an easy coating of the particles because of the high surface tension generally exhibited by synthetic rubber resin latexes. Compounds may be added to the synthetic rubber resin latexes to reduce surface tension and increase spreadability. These materials include methyl cellulose, carboxy methyl cellulose, and various polyacrylates. In addition to the foregoing spreadability additives, it is sometimes desirable to add antifreeze chemicals, rodent and insect repellents, and termite control chemicals.

The process for packaging delicate instruments or other products is illustrated in FIGURES 3 and 4. The spray gun 10 is used to spray a layer of the polystyrene bead-latex spray cushioning material 170 into the bottom of a box 172 until a sufficient shock-absorbing or insulating layer has been built up in the bottom of the box as shown in FIG. 3. The article 174 to be packaged is encased in a polyethylene film bag 176 or is covered with some other protective wrapping and is placed on top of the formed layer of material. The article can be pushed into the cushioning material 170 slightly as shown. The spraying process is then continued, as shown in FIG. 4, and the box is filled with the latex-polystyrene bead composition so that it completely surrounds the packaged article and affords a protective show-absorbing "cocoon" for it. The latex adhesive dries rapidly in the presence of the water setting material on the beads, and, in about one minute, the material 170 has set into a light-weight, tough and resilient mass. When it is desired to remove the article from the package, the cushioning material can readily be stripped away and disposed of.

I claim:

1. A packaging material comprising a plurality of light-weight particles bonded together with a water setting material and a synthetic resin latex, said material having a density in the range of from about 0.9 pound per cubic foot to about 6 pounds per cubic foot.

2. A packaging material according to claim 1 wherein said insulation particles are formed from a foam plastic material and have an average diameter of less than one quarter of an inch.

3. A packaging material according to claim 2 wherein said water setting material is gypsum plaster.

4. A package comprising a container and an article within said container that is subject to breakage in shipping, said article being enclosed within a composition comprised of a plurality of light-weight, resilient particles having an average diameter of less than one-quarter of an inch and an adhesive binder of a synthetic resin latex joining said particles together, said composition having a density of less than six pounds per cubic foot.

5. A package according to claim 4 wherein said light-weight, resilient particles are beads of an expanded polymeric material.

6. A process for packaging an article comprising the steps of spraying light-weight particles and an adhesive binder from separate sources into a container to a depth sufficient to provide a shock-absorbing layer, said particles and adhesive combining during the spraying to form a light-weight, resilient cushioning material, placing the article on said layer spaced from the side walls of said container, and spraying said particles and binder around and over said article so as to enclose it within a shell of said cushioning material.

7. A process for packaging an article according to claim 6 wherein said material comprises light-weight particles having an average diameter of less than one-quarter of an inch, an aqueous synthetic resin latex, and a water setting material, said resin being characterized by its ability to enter into a green cure upon the loss of excess water, with said water setting material being present in an amount adequate to place the resin into a green cure, thereby providing an adhesive for bonding adjoining particles together.

8. A process for packaging an article according to claim 6 wherein said particles are formed from a foam plastic material.

9. A process for packaging an article according to claim 6 and including the step of enclosing the article in a protective wrapper prior to its insertion in the container.

10. A process for packaging an article comprising the steps of spraying a loose mixture of light-weight, cushioning particles and an adhesive binder into a container so as to surround an article positioned therein, said binder joining said particles together in the container to cause a lightweight, resilient mass to be formed about said article.

References Cited

UNITED STATES PATENTS

| | | | |
|---|---|---|---|
| 1,513,148 | 10/1924 | Bartlett | 206—46 |
| 2,579,036 | 12/1951 | Edelman | 206—46 |
| 2,653,139 | 9/1953 | Sterling | 206—46 |
| 2,895,603 | 7/1959 | Freeman | 206—46 |
| 2,981,984 | 5/1961 | Orr | 206—46 |
| 3,047,136 | 7/1962 | Graham | 206—46 |
| 3,066,382 | 12/1962 | Zweigle et al. | 206—46 X |
| 3,096,879 | 7/1963 | Schumalcher | 206—46 |
| 3,145,837 | 8/1964 | Lewis et al. | 206—46 |
| 3,222,843 | 12/1966 | Schneider | 206—46 |

JAMES B. MARBERT, *Primary Examiner.*

U.S. Cl. X.R

53—36